US005165144A

United States Patent [19]

Nisenbaum

[11] Patent Number: 5,165,144

[45] Date of Patent: Nov. 24, 1992

[54] TOOL HANDLE AND ANGULARLY ADJUSTABLE ATTACHMENT

[76] Inventor: Philip Nisenbaum, 7106 Checkerbloom, Citrus Heights, Sacramento, Calif. 95610

[21] Appl. No.: 705,316

[22] Filed: May 24, 1991

Related U.S. Application Data

[63] Continuation-in-part of Ser. No. 346,580, May 2, 1989, Pat. No. 5,060,343, which is a continuation-in-part of Ser. No. 824,735, Jan. 31, 1986, Pat. No. 4,828,427.

[51] Int. Cl.[5] ........................ A47B 95/02; A47J 45/00; B65D 25/28; E05B 1/00

[52] U.S. Cl. ................................ 16/111 R; 16/114 R; 15/145; 294/54.5; 403/96

[58] Field of Search ................. 16/114 R, 112, 111 R, 16/110 R; 403/92, 93, 96; 294/58, 54.5; 15/145

[56] References Cited

U.S. PATENT DOCUMENTS 1,140,020 5/1915 Bradley ................................ 403/96
3,624,855 12/1971 Shaw .................................... 16/115
4,155,582 5/1979 Reisner ................................ 294/58

*Primary Examiner*—John Sipos
*Assistant Examiner*—Carmine Cuda

[57] ABSTRACT

An ergonometrically designed tool handle has a pair of perpendicularly extending hand grips secured at spaced locations along the handle. The tool handle allows prolonged usage by an individual without back strain. The tool handle includes a plurality of intersecting inclined portions which dispose the hand grips in optimal orientation. In a first embodiment, the tool handle has a distal end dimensioned for engagement with a hollow cylindrical socket on a tool head shank. In a second embodiment, a pair of offset sockets are provided on the handle for removable reception of a pair of tool head shanks. An adapter is disclosed which enables conversion of the dual socketed handle for use with single socketed tools. The adapter also provides an angulated extension of the tool handle. The tool handle is designed for use with interchangeable tool heads which may include a hoe, a shovel, a rake, and a scraper. An angularly adjustable tool head attachment allows a tool head of a selected configuration to be secured at a one of a plurality of discrete angular positions.

10 Claims, 7 Drawing Sheets

TOOL HANDLE AND ANGULARLY ADJUSTABLE ATTACHMENT

CROSS REFERENCE TO RELATED APPLICATIONS

This application is a continuation-in-part of Ser. No. 07/346,580, filed May 2, 1989, now U.S. Pat. No. 5,060,343, which is a continuation-in-part of Ser. No. 06/824,735, filed Jan. 31, 1986, and now U.S. Pat. No. 4,828,427.

BACKGROUND OF THE INVENTION

1. Field of the Invention

The present invention relates to tool handles, and more particularly pertains to a new and improved tool handle for use with a variety of interchangeable tool heads such as a hoe, a shovel, a rake and a scraper. The conventional form of these tools utilizes an elongated cylindrical handle. The use of this conventional form of tool handle causes the active portion of the tool to be disposed at the end of a relatively long lever arm remote from the portion of the lever arm grasped by a user. This results in the transmission of relatively large forces to the hands and subsequently through the arms to the lower back of the individual. This results in back strain and possible spinal damage to tool users over a protracted length of time. In order to overcome these problems, the present invention provides an ergonometrically designed tool handle which provides additional leverage and a safer force distribution.

2. Description of the Prior Art

Various types of tool handles are known in the prior art. Typical examples of such tool handles are to be found in U.S. Pat. No. 2,813,466, which issued to Torgerson on November 1957, U.S. Pat. No. 2,912,851, which issued to Karnes on November 1959, U.S. Pat. No. 3,341,235, which issued to Mattson et. al. on September 1967, U.S. Pat. No. 4,386,901, which issued to Morrison on June 1983, U.S. Pat. No. 4,495,669, which issued to Hooper on January 1985 and U.S. Pat. No. 4,752,156, which issued to Owens on June 1988.

While the above mentioned devices are directed to tool handles, none of these devices disclose an ergonometrically designed handle having first and second perpendicular hand grips disposed at spaced locations along an elongated handle formed by a plurality of inclined intersecting portions and including a quick release socket for removable retention of a variety of different tool heads. Inasmuch as the art is relatively crowded with respect to these various types of tool handles, it can be appreciated that there is a continuing need for and interest in improvements to such tool handles, and in this respect, the present invention addresses this need and interest.

SUMMARY OF THE INVENTION

In view of the foregoing disadvantages inherent in the known types of tool handles now present in the prior art, the present invention provides an improved tool handle. As such, the general purpose of the present invention, which will be described subsequently in greater detail, is to provide a new and improved tool handle which has all the advantages of the prior art tool handles and none of the disadvantages.

To attain this, representative embodiments of the concepts of the present invention are illustrated in the drawings and make use of an ergonometrically designed tool handle having a pair of perpendicularly extending hand grips secured at spaced locations along the handle. The tool handle allows prolonged usage by an individual without back strain. The tool handle includes a plurality of intersecting inclined portions which dispose the hand grips in optimal orientation. In a first embodiment, the tool handle has a first distal end dimensioned for engagement with a hollow cylindrical socket on a tool head shank. In a second embodiment, a pair of offset sockets are provided on the handle for removable reception of a pair of tool head shanks. An adapter is disclosed which enables conversion of the dual socketed handle for use with single socketed tools. The adapter also provides an angulated extension of the tool handle. The tool handle is designed for use with interchangeable tool heads which may include a hoe, a shovel, a rake, and a scraper. The tool handle is designed for use with interchangeable tool heads which may include a hoe, a shovel, a rake, and a scraper. An angularly adjustable tool head attachment allows a tool head of a selected configuration to be secured at a one of a plurality of discrete angular positions.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tool handle which has all the advantages of the prior art tool handles and none of the disadvantages.

It is another object of the present invention to provide a new and improved tool handle which may be easily and efficiently manufactured and marketed.

It is a further object of the present invention to provide a new and improved tool handle which is of a durable and reliable construction.

An even further object of the present invention is to provide a new and improved tool handle which is susceptible of a low cost of manufacture with regard to both materials and labor, and which accordingly is then susceptible of low prices of sale to the consuming public, thereby making such tool handles economically available to the buying public.

Still yet another object of the present invention is to provide a new and improved tool handle which provides in the apparatuses and methods of the prior art some of the advantages thereof, while simultaneously overcoming some of the disadvantages normally associated therewith.

Still another object of the present invention is to provide a new and improved tool handle having retaining means for removable securement to a variety of different tool heads to provide a multi-purpose implement.

Yet another object of the present invention is to provide a new and improved tool handle which utilizes a pair of spaced perpendicular hand grips resulting in a superior ergonometric force distribution on a using individual.

Even still another object of the present invention is to provide a new and improved tool handle having a plurality of angularly intersecting portions and a pair of spaced perpendicular hand grips to enable individuals to utilize various interchangeable tool heads without incurring back strain and injury.

A further object of the present invention is to provide an angularly adjustable tool head attachment which allows a tool head of any selected configuration to be secured at one of a plurality of different angular positions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
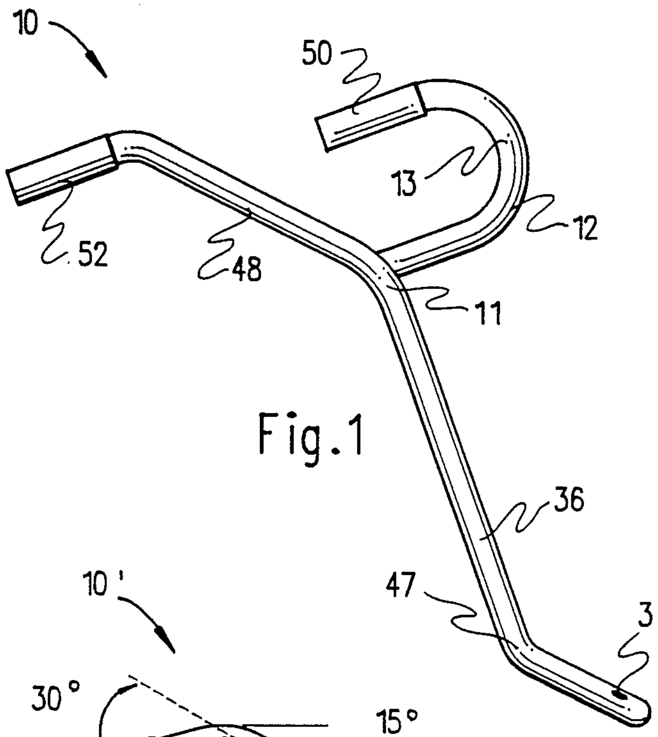
FIG. 1 is a perspective view illustrating a tool handle according to a first embodiment of the present invention.

With reference now to the drawings, and in particular to FIG. 1 thereof, a new and improved tool handle embodying the principles and concepts of the present invention and generally designated by the reference numeral 10 will be described.

More specifically, it will be noted that the first embodiment 10 of the invention includes an elongated handle preferably formed from a cylindrical metal tubing. A first end of the handle is provided with a retaining element for securement to a variety of variously configured tool heads. The retaining member may take the form of a cylindrical portion, having a transverse aperture 31, which is dimensioned for insertion into a slightly larger diameter cylindrical socket provided on a tool head. A retaining pin is then inserted through aligned transverse apertures in the tool head socket and through the transverse aperture 31 at the first end of the tool handle 10. The retaining pin may take a wide variety of conventional forms and may comprise a threaded fastener. Alternatively, this construction may be reversed and a hollow cylindrical socket may be formed at the first end of the handle 10 and a shank may be formed on the tool head for insertion into the socket at the distal end of the handle 10. Either of these alternative constructions may be utilized without departing from the scope of the present invention. The handle 10 includes a first portion extending upwardly and rearwardly from the retaining element 31 and obliquely intersecting a second handle portion at a smooth radiused bend 47. The second inclined handle portion 36 extends upwardly at a steeper angle than the first distal handle portion. A third handle portion 48 intersects the second handle portion 36 at a smooth radiused bend 11. A fourth handle portion intersects an upper end of the third handle portion 48 and extends downwardly and rearwardly to an upper second end of the handle, terminating in a first hand grip 52. A second hand grip 50 is secured intermediate the first and second ends of the handle 10 adjacent the intersection 11 of the second and third inclined handle portions by a generally U-shaped bar 12 having a smooth radius bend 13. The second hand grip 50 extends transversely above the handle 10 and perpendicular to the first hand grip 52.

Figure 2:
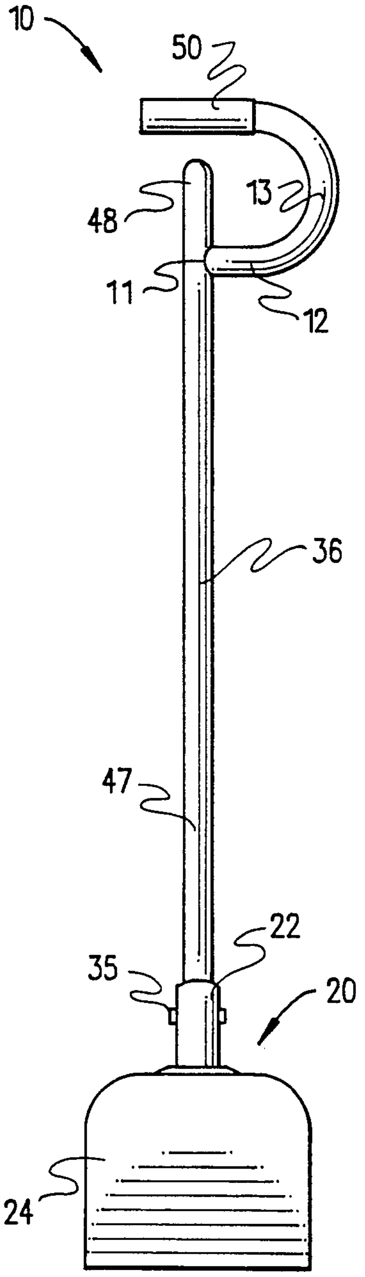
FIG. 2 is a front elevational view of the tool handle according to the first embodiment of the present invention, having a hoe blade tool head attached thereto.

FIG. 2 illustrates the tool handle according to the first embodiment of the invention, secured to a hoe tool head 20. The tool head includes a cylindrical socket 22 which receives the distal end portion of the handle 10 and is secured thereto by a retaining member 35. The retaining member 35 may comprise a pin, a threaded fastener, or other conventional forms of such retaining elements. The tool head 20 is designed for performing conventional ground tilling operations and includes a hoe blade 24.

Figure 3:
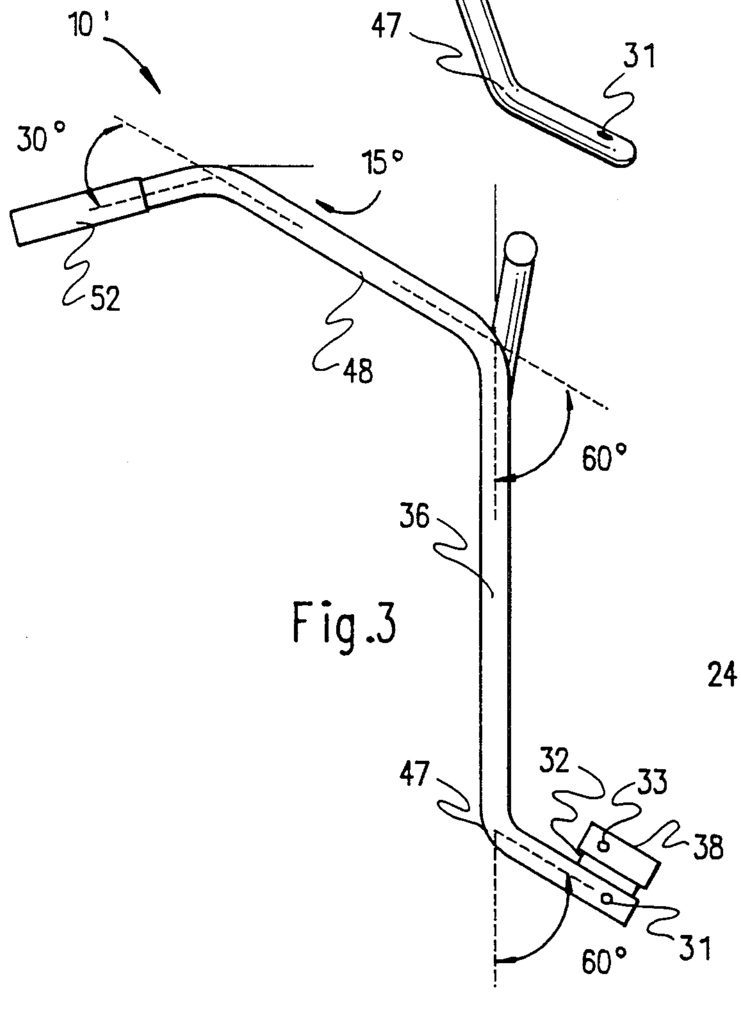
FIG. 3 is a side elevational view illustrating a tool handle according to a slightly modified second embodiment of the present invention.

FIG. 3 illustrates a second embodiment 10' of the present invention constructed identically as described previously with reference to the first embodiment 10 illustrated in FIG. 1, with the exception of the tool head securing arrangement provided at the distal end portion of the handle 10'. The various inclined portions of the handle 10' are preferably oriented at the illustrated angles, but other angular orientations may be selected without departing from the scope of the present invention. The tool securing arrangement includes a pair of laterally offset parallel hollow cylindrical sockets secured at the distal end of the tool 10'. A first hollow cylindrical socket is formed within the end portion of the handle 10' and includes a transverse aperture 31 for the reception of a retaining pin or threaded fastener. The second socket 38 is secured at a laterally offset position by a spacer 32 which may comprise a weld bead. The socket 38 includes a transverse aperture 33 for insertion of a retaining pin or fastener through aligned apertures of an inserted tool head shank. In use, an individual grasps the hand grip 52 in one hand, and the grip 50 in the other hand. The grip 52 is maintained close to the individual's body, which minimizes back strain, while the grip 50 is oriented perpendicular to the grip 52, intermediate the ends of the handle 10', which provides a leverage fulcrum for the handle portion 48, and also allows and individual to transmit large forces from the relatively powerful shoulder muscles to an attached tool head.

Figure 4:
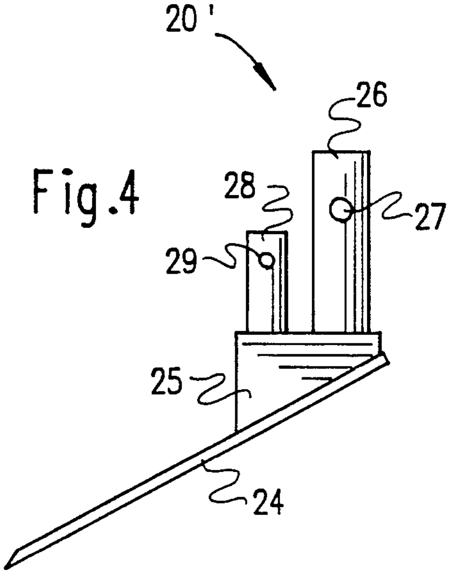
FIG. 4 is a side view illustrating a modified hoe blade for use with the tool handle of FIG. 3.

FIG. 4 illustrates a modified form of hoe blade tool head 20' configured for use with the tool handle 10' of FIG. 3. The tool head 20' includes a pair of shanks 26 and 28 provided with transverse apertures 27 and 29 dimensioned for orientation in aligned relation within the securement sockets of the handle 10' of FIG. 3. The tool head 20' includes a hoe blade 24 secured by an inclined mounting bracket 25 which provides the correct angular orientation to facilitate expedient usage of the tool head.

Figure 5:
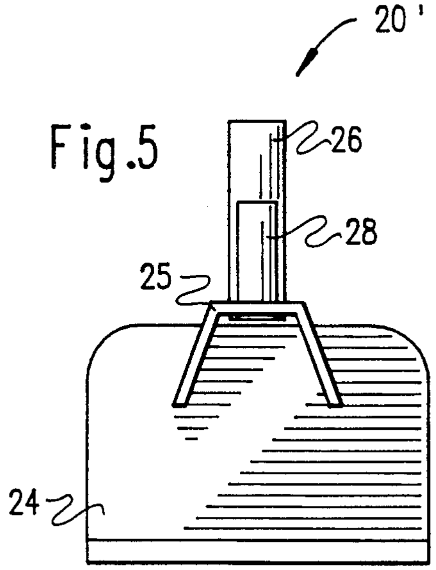
FIG. 5 is a front view of the hoe blade of FIG. 4.

FIG. 5 illustrates a front view of the tool head 20'.

Figure 6:
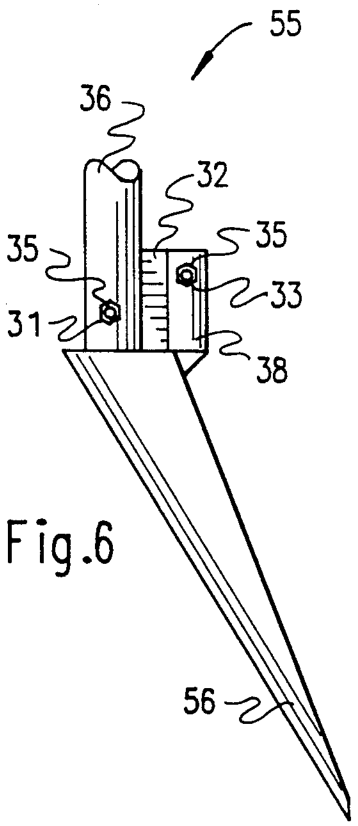
FIG. 6 is a detail view illustrating a shovel blade tool head secured at the distal end of the tool handle of FIG. 3.

FIG. 6 is a side view, partially cut away, illustrating a shovel tool head 55 secured in an operative position at the distal end portion 36 of the tool handle 10' illustrated in FIG. 3. While the retaining members 35 received through the transverse apertures 31 and 33 have been illustrated as conventional threaded fasteners, it should be understood that the practice of the present invention is not limited to the use of threaded fasteners and many other securing members such as retaining pins may be utilized. The shovel tool head 55 includes a blade portion 56 for use in a conventional fashion.

Figure 7:
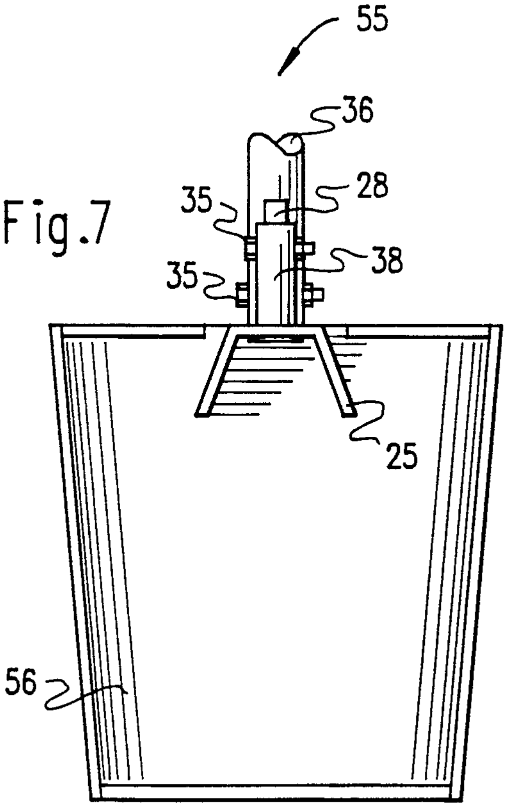
FIG. 7 is a front view of the shovel blade tool head of FIG. 6.

FIG. 7 is a front view further illustrating the shovel tool head 55 of FIG. 6.

Figure 8:
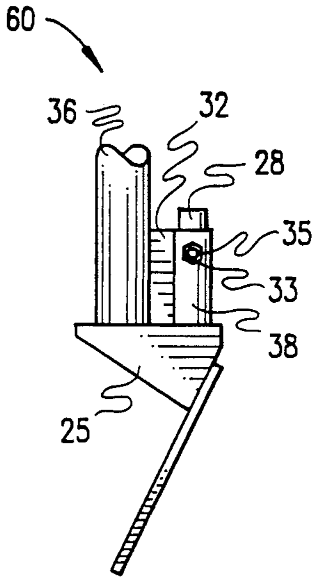
FIG. 8 is a side view illustrating a rake tool head secured to the distal end of the tool handle of FIG. 3.

FIG. 8 is a detail view, partially cut away, illustrating a side view of a rake tool head 60 secured in an operative position on the end portion 36 of the tool handle 10'.

Figure 9:
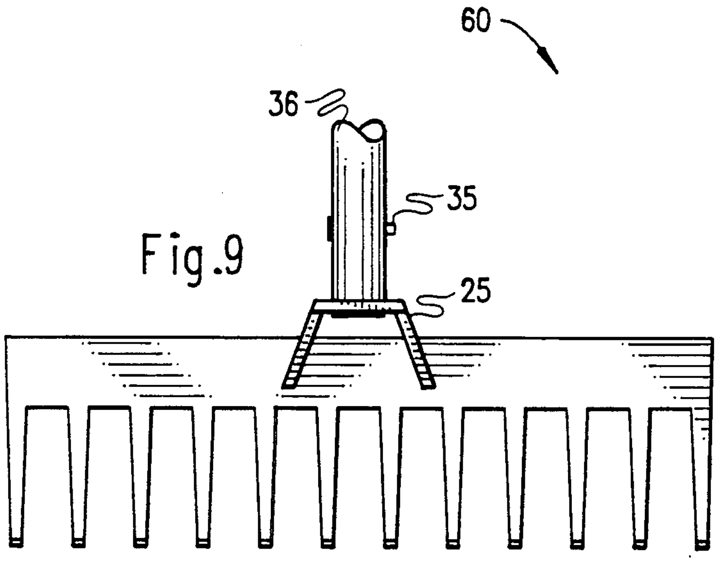
FIG. 9 is a front view of the rake tool head of FIG. 8.

FIG. 9 is a front view further illustrating the construction of the rake tool head 60.

Figure 10:
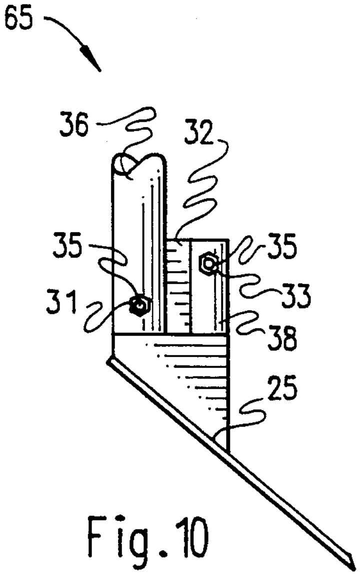
FIG. 10 is a side view illustrating a scraper blade tool head mounted on the distal end of the tool handle of FIG. 3.

FIG. 10 is a side view illustrating a scraper tool head secured in an operative position on the end portion 36 of the tool handle 10'.

Figure 11:
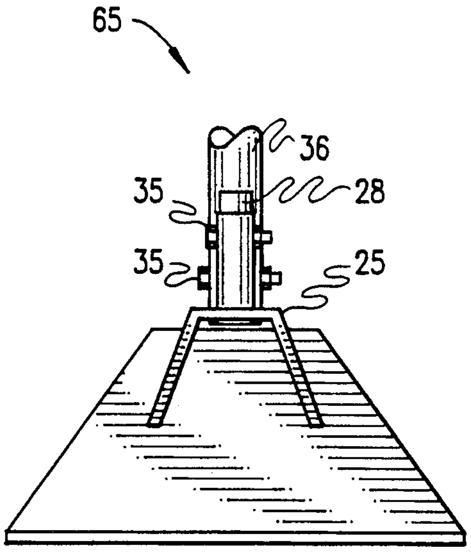
FIG. 11 is a front view of the scraper blade tool head of FIG. 10.

FIG. 11 is a front view of the scraper tool head 65.

Figure 12:
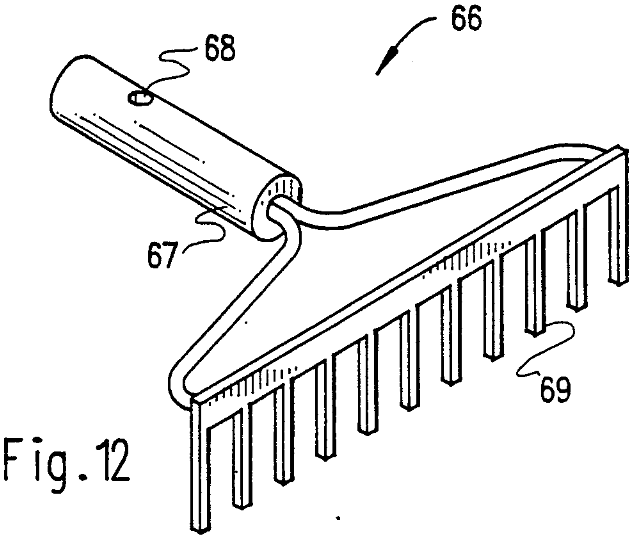
FIG. 12 is a perspective view illustrating a rake attachment for use with the tool handle of FIG. 1.

FIG. 12 is a perspective view which illustrates a rake attachment tool head 66 designed for use with the tool handle of FIG. 1. A rake head 69 is secured to a cylindrical socket 67 which is hollow and dimensioned to receive a distal end portion of the tool handle. An aperture 68 extends transversely through the socket 67 for insertion of a retaining pin or bolt.

Figure 13:
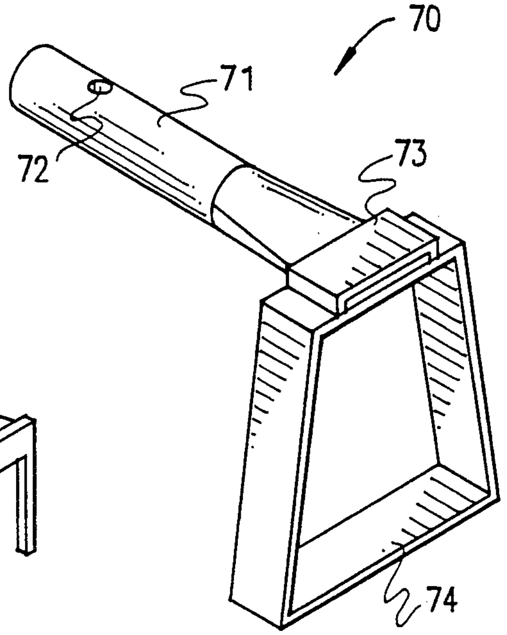
FIG. 13 is a perspective view illustrating a cultivating hoe attachment for use with the tool handle of FIG. 1.

FIG. 13 illustrates a conventional form of cultivating hoe, known as an "action hoe", formed as a tool head attachment 70. The hoe head 74 is secured with play, in a conventional fashion, to a short flexible shank 73. This allows limited arcuate reciprocal movement of the head 74 to facilitate cultivation. The shank 73 is secured to a hollow cylindrical socket 71 having a transverse aperture 72, adapted to engage the distal end of the tool handle of FIG. 1.

Figure 14:
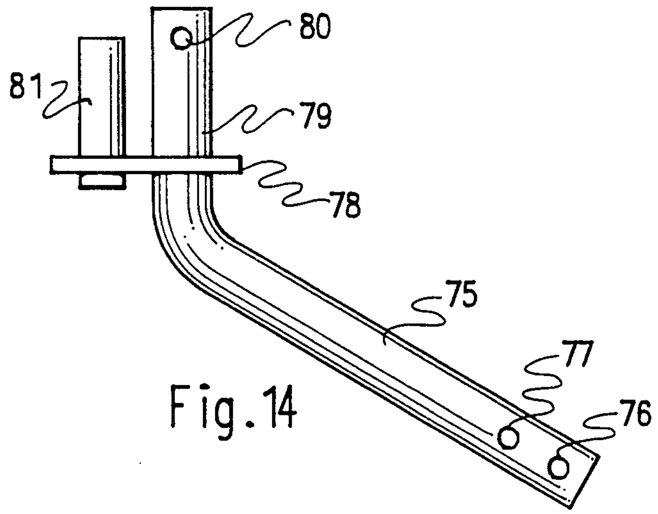
FIG. 14 is a side view illustrating an adapter for use with the tool handle of FIG. 2.

FIG. 14 is a side view illustrating an adapter for use with the tool handle of FIG. 2. A cylindrical tubular member 75 is provided with transverse apertures 76 and 77 for receiving retaining pins or bolts to secure the distal end of the member 75 in a hollow cylindrical socket of a tool head of the type illustrated in FIGS. 12 and 13. An upper tubular member 79 is angularly bent with respect to the lower member 75, and includes a bracket 78 mounting a shaft 81 in an offset manner. Transverse retaining apertures, as shown at 80 may be provided in both the member 79 and offset shaft 81.

Figure 15:
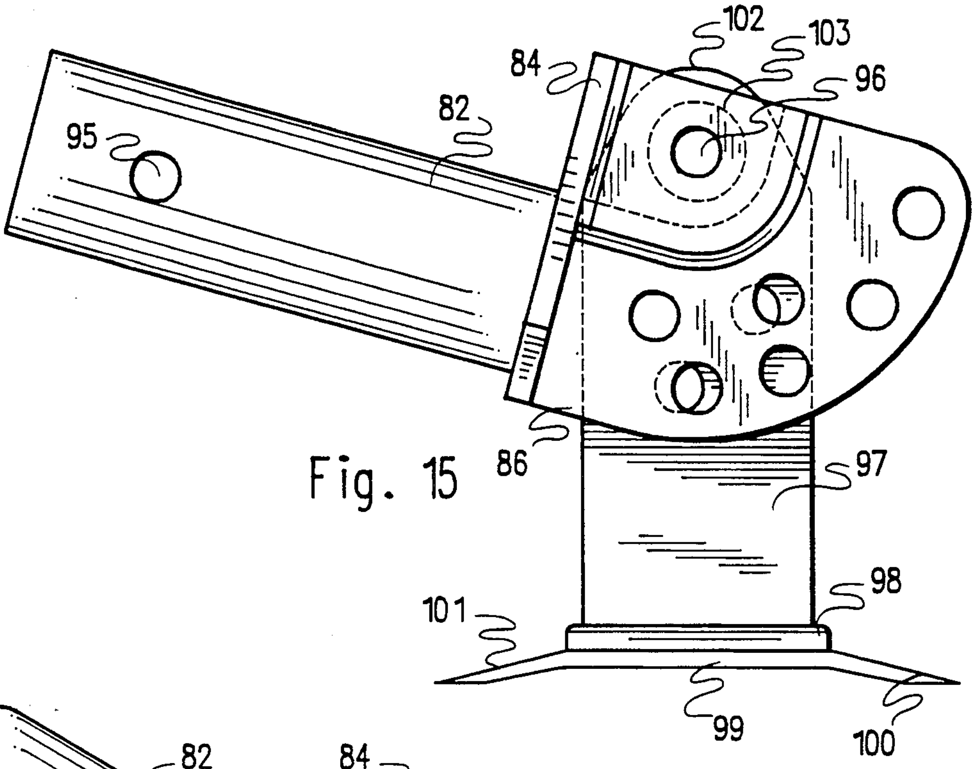
FIG. 15 is a side view illustrating an angularly adjustable tool head attachment for use with the tool handle of FIG. 1, depicting a hoe/surface weeder as an example tool.
Figure 16:
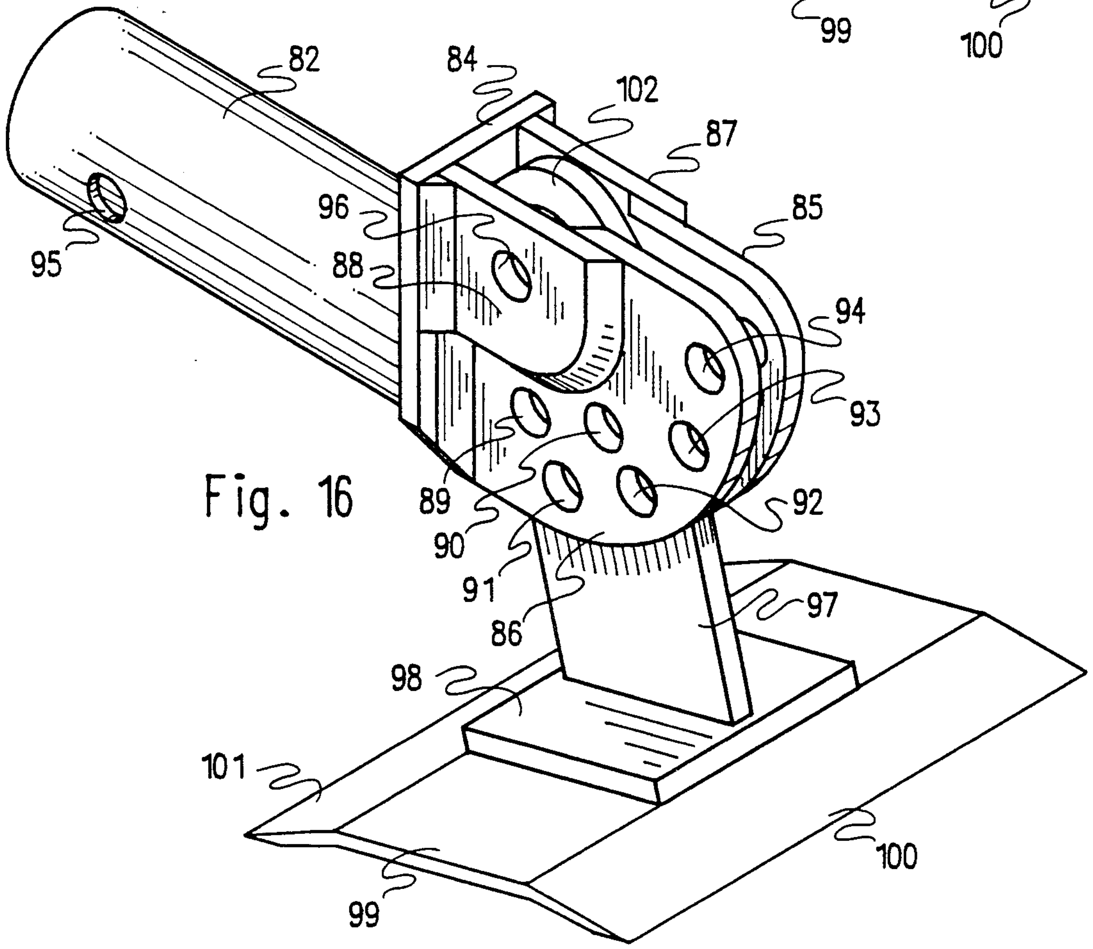
FIG. 16 is a perspective view of the angularly adjustable tool head attachment of FIG. 15.
Figure 17:
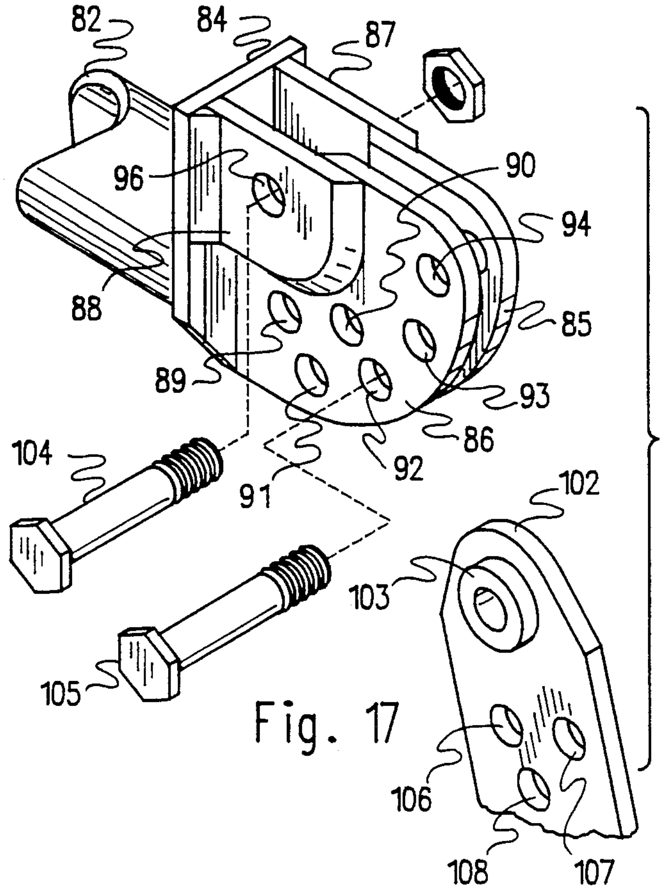
FIG. 17 is an exploded perspective view, partially cut-away, further illustrating the construction of the angularly adjustable tool head attachment of FIG. 15.
Figure 18:
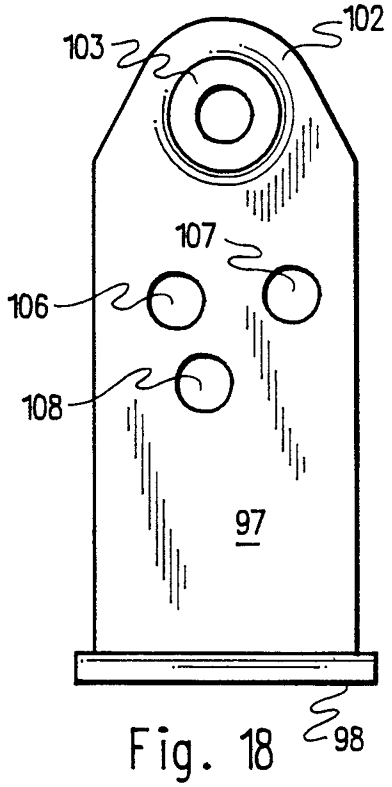
FIG. 18 is a side view of the pivotal tool head mounting tang of the angularly adjustable tool head attachment of FIG. 15.
Figure 19:
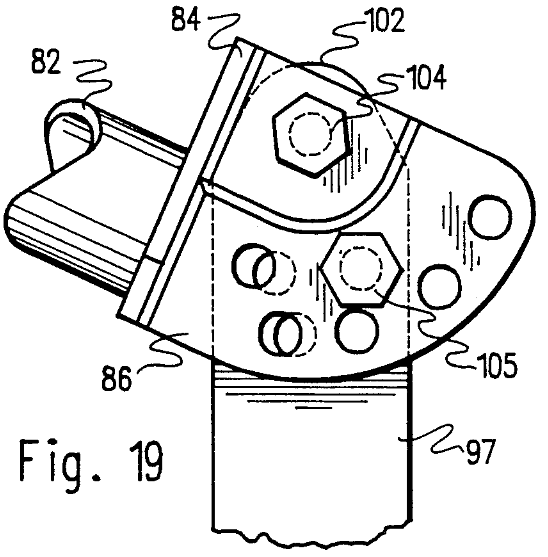
FIG. 19 is a side view, partially cut-away, illustrating the angularly adjustable tool head attachment of FIG. 15 in a first angular position.
Figure 20:
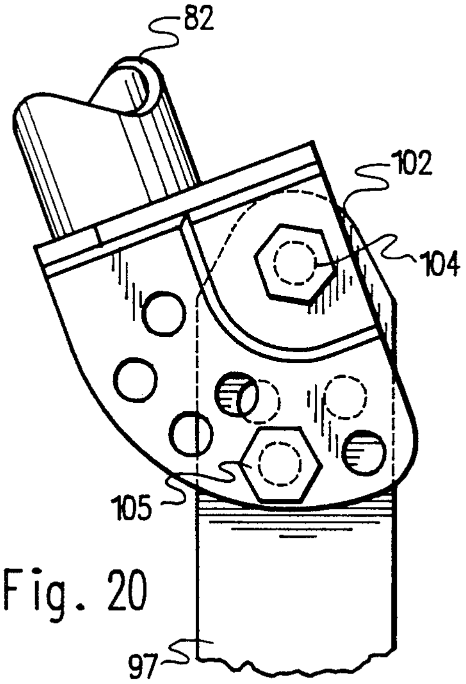
FIG. 20 is a side view, partially cut-away, illustrating the angularly adjustable tool head attachment of FIG. 15 in a second angular position.
Figure 21:
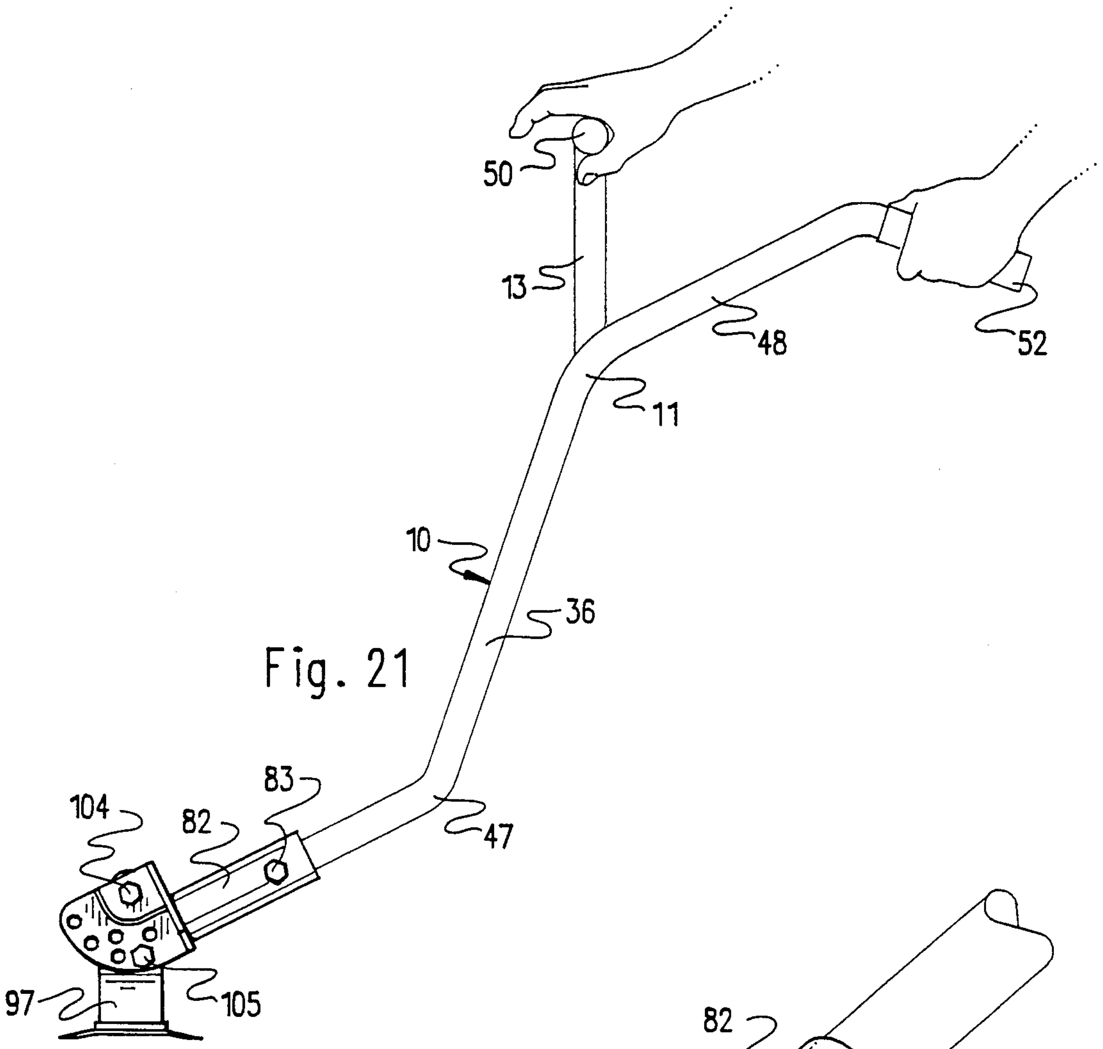
FIG. 21 is a side view illustrating the angularly adjustable tool head attachment of FIG. 15 mounted on the handle of FIG. 1.
Figure 22:
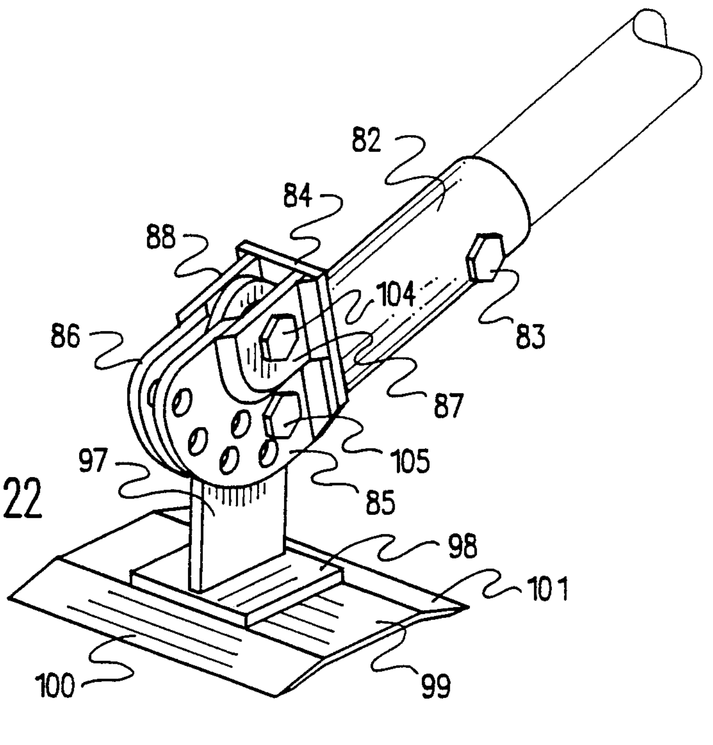
FIG. 22 is a perspective view of the angularly adjustable tool head attachment of FIG. 15 mounted on the distal end of the handle of FIG. 1.

FIGS. 15–22 illustrate an angularly adjustable tool head attachment designed for use with the handle of FIG. 1. A hollow tubular cylindrical socket 82, having an aperture 95, is dimensioned to receive the distal end portion of the handle shank 36, as shown in FIG. 21. A retaining pin or bolt 83 secures the socket 82 to the tool handle. A plate 84 extends transversely between parallel plates 85 and 86. A transverse bore 96 extends through reinforced bosses 87 and 88 on the plates 85 and 86, as shown in FIGS. 15 and 16. A pivot pin or bolt 104 extends through the aperture 96, and through a bushing 103 secured to the upper end 102 of a pivotal tang 97, as shown in FIGS. 17 and 18. As shown in FIGS. 16 and 17, transverse bores 89, 90, 91, 92, 93, and 94 extend through plates 85 and 86. Cooperating circular apertures 106, 107 and 108 are formed through tang 97, as shown in FIG. 18. By inserting a retaining pin or bolt 105 through a selected one of the bores in the plates 85 and 86 and through one of the apertures in tang 97, the tang 97 may be secured at a wide variety of discrete angular positions with respect to the central longitudinal axis of the socket 82. The bores through the plates 85 and 86 and the tang 97 may be formed in a variety of different patterns, within the scope of the invention. Additionally, a pair of retaining pins or bolts 105 may be installed through aligned holes in the plates 85, 86 and the tang 97, to enhance the strength of the assembly.

For illustrative purposes, the example tool head secured to the tang 97 takes the form of a hoe/surface weeder. A transverse plate 98 is secured, by welding for example, to the free end of the tang 97. A blade 99 having opposed chamfered sharpened edges 100 and 101 is secured to the plate 98. Of course, the angularly adjustable tool head attachment may be used in conjunction with diverse other tool configurations, such as those illustrated in FIGS. 2-13 describe above.

It should be understood that each of the various tool heads described above may be alternatively provided with a cylindrical socket for use with the tool handle 10 illustrated in FIG. 1, without departing from the scope of the present invention. Further, the illustrated configurations of tool head are intended as examples only, and a wide variety of other conventional tools may be formed as interchangeable heads suitable for use with the tool handle of the present invention. As may now be understood, the tool handle and interchangeable tool heads of the present invention allow a large number of tools to be stored and transported in a relatively small area and additionally eliminate the expense of purchasing separate handles for each particular type of tool. The ergonometric advantages of the tool handle of the present invention may thus be achieved while performing a wide variety of conventional tasks.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the U.S. is as follows:

1. A tool handle that is ergonometrically defined and configured, for attachment to various tool heads, including a structure of rigid tubing location and orienting a lower front tool head attachment end, and upper front and upper rear hand grips, with a tool head, removably installed on said tool handle, would allow the individual user to stand substantially erect, move the tool head with much force, great control and a minimum of strain, and comprising:

an elongated handle having first and second ends; a hollow cylindrical distal end portion for coupling to a tool head shank and a first retaining pin adapted to extend through aligned transverse apertures in said distal end portion and said tool head shank for removably securing a tool head at said first end of said handle;

a first hand grip on said second end of said handle;

a first substantially straight handle portion extending upwardly and rearwardly from said first end;

a second substantially straight handle portion intersecting said first handle portion and extending upwardly and rearwardly at a steeper angle than said first handle portion;

a third substantially straight handle portion intersecting said second handle portion and extending upwardly and rearwardly at a shallower angle than said second handle portion;

a fourth handle portion intersecting said third handle portion and extending downwardly and rearwardly to the second handle end and;

a second hand grip secured adjacent the intersection of said second and said third handle portions by an integral tubular, generally U-shaped bar, said second hand grip covering an upper leg part of said U-shaped bar extending generally transversely above said handle and generally perpendicular to said first hand grip;

all said tool handle portions are contained in one plane which is perpendicular to the plane of said second hand grip;

said first hand grip and said second hand grip being adapted for use by an individual standing substantially erect, said first hand grip being used by the lower or rear hand, and said second hand grip being used by the upper or forward hand.

2. A tool device including the tool handle of claim 21, in combination with a tool head adapter capable of receiving and retaining a tang mounted tool head, locking said tang mounted tool head in various selected angular positions, said tool head adapter having:

a hollow socket shank dimensioned to be coupled to said tool handle at said tool handle distal end portion;

a structure comprising a lateral plate and a pair of parallel plates secured to said hollow socket shank;

a pivotal means constructed within said parallel plates, comprising reinforced plate areas with lateral aligned apertures through said plates reinforced areas;

a tang with a transverse aperture through its pivotal center dimensioned to receive a second retaining pin adapted to extend through aligned transverse apertures in said pivotal means and the pivotal center of said tang, a structure secured to the free end of said tang for mounting a designated tool head;

a retaining means for said tool head adapter comprising said hollow socket shank dimensioned to receive said hollow distal end portion, and said first retaining pin adapted to extend through aligned transverse apertures in said tool handle distal end portion and said tool head adapter hollow socket shank;

a plurality of apertures extending through said parallel plates and said tang on two arcs concentric with said pivot points;

said apertures disposed in an array such that apertures through said plates and said tang are alignable in a plurality of different angular positions of said tang, with unequal angular distances between apertures in said tang, to allow close adjustment of the angular position of said tang; and a third retaining pin received through at least one set of aligned apertures in said plates and said tang in a selected adjusted and retained angular position.

3. The device of claim 2 wherein a double edged blade tool head is mounted on said tang free end structure of said tool hand adapter.

4. The tool handle of claim 1 wherein a hoe tool head is mounted on said hollow cylindrical distal end portions of said tool handle first end.

5. The tool handle of claim 1 wherein a scraper tool head is mounted on said hollow cylindrical distal end portion of said tool handle first end.

6. The tool handle of claim 1 wherein an action hoe is mounted on said hollow cylindrical distal end portion of said tool handle first end.

7. The tool handle of claim 1 wherein a rake tool head is mounted on said hollow cylindrical distal end portion of said tool handle first end.

8. The tool handle of claim 1 wherein said handle includes at least two obliquely intersecting inclined portions.

9. The tool handle of claim 1, wherein said handle includes at least three obliquely intersecting inclined portions contained in one plane perpendicular to said second handle grip.

10. The tool handle of claim 1, wherein said handle includes at least four obliquely intersecting inclined portions contained in one plane perpendicular to said second handle grip.

* * * * *